(12) United States Patent
Ueda et al.

(10) Patent No.: US 8,376,370 B2
(45) Date of Patent: *Feb. 19, 2013

(54) GASKET

(75) Inventors: Takahisa Ueda, Sanda (JP); Atsushi Suehiro, Sanda (JP); Hisashi Maeda, Sanda (JP); Hiroki Tanabe, Sanda (JP)

(73) Assignee: Nippon Pillar Packing Co., Ltd., Osaka-Shi (JP)

( * ) Notice: Subject to any disclaimer, the term of this patent is extended or adjusted under 35 U.S.C. 154(b) by 305 days.

This patent is subject to a terminal disclaimer.

(21) Appl. No.: 12/741,319

(22) PCT Filed: Oct. 10, 2008

(86) PCT No.: PCT/JP2008/068457
§ 371 (c)(1),
(2), (4) Date: May 4, 2010

(87) PCT Pub. No.: WO2009/060689
PCT Pub. Date: May 14, 2009

(65) Prior Publication Data
US 2010/0237570 A1 Sep. 23, 2010

(30) Foreign Application Priority Data

Nov. 5, 2007 (JP) ................... 2007-287496

(51) Int. Cl.
*F02F 11/00* (2006.01)
*F16J 15/08* (2006.01)
(52) U.S. Cl. ................. 277/592; 277/598; 277/654

(58) Field of Classification Search .......... 277/592–598, 277/650–654, 628, 630, 637
See application file for complete search history.

(56) References Cited

U.S. PATENT DOCUMENTS

| 922,130 | A | * | 5/1909 | Goetze ........................ 277/612 |
| 3,230,290 | A | * | 1/1966 | Nelson et al. .................. 277/652 |
| 4,196,913 | A | | 4/1980 | Oka |

(Continued)

FOREIGN PATENT DOCUMENTS

| JP | 58-210342 | 12/1983 |
| JP | 63-069855 | 5/1988 |
| JP | 2005-180660 | 7/2005 |

*Primary Examiner* — Vishal Patel
(74) *Attorney, Agent, or Firm* — Rankin, Hill & Clark LLP

(57) ABSTRACT

A gasket having a concentrically waved metal sheet, i.e., a core member, which has a sheet of sealing-property layered and bonded on each of its opposite surfaces. The gasket has an enhanced adaptability of the sheet material and enables the thinner sheet to be used and at the same time makes it possible to ensure a stable sealing-property for a long period of time with a low to a high fastening-load applied. The metal sheet has valley portions, which were conventionally vacant gaps, and are filled with powdered sealing member to be embedded from the beginning. Therefore, the sheet at the valley portions of the metal sheet that conventionally could not be compressed with a low fastening-load applied can be compressed and even with the low fastening-load applied can secure a fastening surface-pressure over the entire surface. Further, since it is possible to suppress the deformation of the sheet in quantity, which was conventionally large, a sheet made of not only the high-fluidity material but also the low-fluidity material can be used as well as the thinner sheet.

4 Claims, 6 Drawing Sheets

U.S. PATENT DOCUMENTS

| | | | |
|---|---|---|---|
| 4,540,183 A * | 9/1985 | Schneider et al. | 277/312 |
| 5,558,347 A * | 9/1996 | Nicholson | 277/652 |
| 5,785,322 A * | 7/1998 | Suggs et al. | 277/615 |
| 6,457,726 B1 * | 10/2002 | Jung | 277/611 |
| 6,565,099 B1 * | 5/2003 | Ottinger et al. | 277/608 |
| 2004/0195782 A1 | 10/2004 | Bram et al. | |

* cited by examiner (A)

(B)

(C)

GASKET

TECHNICAL FIELD

The present invention relates to a gasket which is employed for the usage that seeks a sealing-stability for a long period of time in a severe use-environment such as piping joint-portions (flanges of JIS or JPI standard) or joint portions of machines and instruments (bonnets of valves and the like).

BACKGROUND ART

Conventionally, there has been known such a structure that comprises a concentrically waved metal sheet having opposite surfaces on which expanded-graphite sheets are layered and bonded as a sealing member. This conventional structure employs the concentrically waved metal sheet instead of a core member which comprised a flat metal plate or a metal plate that has opposite surfaces each provided with discontinuous concave and convex portions or worked into a structure having concave and convex portions like saw-teeth, so as to remarkably enhance the compression efficiency, which was extremely small before, and secure so high a deformation-following ability (following ability with respect to the accuracy of the flange-surface) that it can be used for the glass-lining flange distorted or waved. Further, a sheet made of expanded graphite has been utilized for the sealing member as it was done so conventionally. The opposite surfaces in contact with the flange are each formed from a sheet made of expanded graphite, which has a high fluidity and assures an excellent compatibility with the flange.

An explanation is given for a mechanism according to which such a conventional structure exerts the sealing function, with reference to the compression-deformation process of the conventional structure shown in FIG. 8(A) to FIG. 8(C). In these Figures, numeral 1 indicates a concentrically waved metal sheet that constitutes a core member. Numerals 2 and 3 designate expanded-graphite sheets layered and bonded on the opposite surfaces of the metal sheet 1. Numerals 5 and 6 each indicates a flange of a machine or an instrument and a piping. Alphabetical letter (T) means a thickness of the gasket.

In a free state shown in FIG. 8(A) before fastening, the metal sheet 1 has an original wave-pitch (P) and wave-height (T 1/2) (height (T1) of a mountain-like portion) and each of the expanded-graphite sheets 2 and 3 has an original thickness (T2) uniform in its entirety. There are formed vacant gaps 4 between valley portions 1a of the metal sheet 1 and the expanded-graphite sheets 2 and 3.

In a fastened state shown in FIG. 8(B) where a low fastening-load is applied, the metal sheet 1 is compressed between the mutually opposing flanges 5 and 6 in a direction of the thickness while it is decreasing its wave-height (T 1/2) but increasing its wave-pitch (P), so that while making compression-deformation in the thickness-direction, it also performs extension-deformation in a direction of the plane (radially inwards and outward). Although each of the expanded-graphite sheets 2 and 3 is compressed in the thickness-direction at the mountain-like portions 1b of the metal sheet 1, it is not compressed at the valley portions 1a of the metal sheet 1. Therefore, the conventional structure ensures a high fastening surface-pressure locally at the mountain-like portion 1b of the metal sheet 1 to exert a sealing-property. At this time, the expanded-graphite sheets 2 and 3 deform following the position-variation of the mountain-like portions 1b of the metal sheet 1 owing to their high fluidity. Then, without being broken, they are decreasing the thickness T2 at the mountain-like portions 1b of the metal sheet 1 while they are increasing it at the valley portions 1a of the metal sheet 1 to result in partly filling the vacant gaps 4.

In another fastened state shown in FIG. 8(C) where a high fastening-load is applied, the metal sheet 1 is more compressed between the mutually opposing flanges 5 and 6 in the direction of the thickness while it is further decreasing its wave-height (T 1/2) but increasing its wave-pitch (P), so that while making further compression-deformation in the thickness-direction up to a state close to a flat plate, it also performs further extension-deformation in the direction of the plane. At this time, the expanded-graphite sheets 2 and 3 deform following the position-variation of every mountain-like portion 1b of the metal sheet 1 owing to their high fluidity. Then, without being broken, they are further decreasing the thickness T2 at the mountain-like portions 1b of the metal-sheet 1 while they are more increasing it at the valley portions 1a of the metal sheet 1 with the result of ultimately filling the whole vacant gaps 4 completely. Thus the conventional structure exerts a stable sealing-property because the expanded-graphite sheets 2 and 3 are compressed also at the valley-portions 1a of the metal sheet in the thickness direction and secure the fastening surface-pressure over the entire surfaces of the mountain-like portions 1b and the valley portions 1a of the metal sheet 1.

The conventional structure such that the concentrically waved metal sheet has opposite surfaces with the expanded-graphite sheets layered and bonded thereon has been adopted for the gasket described, for example, in Patent Literature 1 and therefore it is publicly known.

Patent Literature: Utility Model Application Laid-Open No. 5-92574

DISCLOSURE OF THE INVENTION

Problem the Invention Attempts to Solve

Since the above-mentioned conventional structure uses for the core member, the concentrically waved metal sheet, it has the following problems:

(A) With a low fastening-load applied, it is difficult to ensure a fastening surface-pressure over the entire surface, and the sealing-stability is poor;

(B) With a high fastening-load applied, in order to secure a fastening surface-pressure over the entire surface, the sealing member should have fluidity and therefore is low in adaptability as regards its materials (the materials available for them are limited). Concretely, for example, the polytetrafluoroethylene-resin (hereafter, referred to only as 'PTFE') sheet employed mainly as the sealing member for most of the acid or alkaline fluids at a temperature of not more than 260° C. and an inorganic sheet such as a mica sheet, a vermiculite sheet or a metal sheet used principally as the sealing member for the acid fluids at a temperature of not less than 400° C. are remarkably low in fluidity when compared with the expanded-graphite sheet and therefore is difficult to be used for the sealing member. In consequence, so far as the materials available for the gasket are concerned, they are confined to the non-oxidizable fluids of a temperature not more than 400° C. for which the expanded-graphite sheet can be used; and (C) The foregoing sealing members (sheet members) are expensive and are low in yield. Further, economically, a sheet as thin as possible should be used. However, with a high fastening-load applied, in order to secure the fastening surface-pressure over the entire surface, the sealing member needs the fluidity as well as a thickness more than that of a certain degrees (quantity of the material) and also the sealing member thinner than those currently utilized is difficult for use. Additionally, with a high fastening-load applied, it is necessary to provide the sealing member with a thickness of more than a certain degrees so as to avoid its destruction.

In view of the forgoing problems, the present invention has been created and has an object to provide a gasket of a structure which comprises a concentrically waved metal sheet, i.e., a core member, which has a sheet of sealing-property layered and bonded on each of its opposite surfaces or which has opposite surfaces and an inner periphery each coated with a molded member of sealing-property. The gasket has an enhanced adaptability of the material for the sheet or the molded member (corresponding to the sealing member of the conventional structure) and enables the sheet or the molded material thinner than the conventional one to be used and at the same time makes it possible to ensure a stable sealing-property for a long period of time with a low to a high fastening-load applied.

Means for Solving the Problem

The gasket as defined in claim 1 in order to accomplish the above object, comprises a concentrically waved metal sheet which has valley portions each filled with powdered sealing member and has a sheet of sealing-property layered and bonded on each of its opposite surfaces.

The gasket as defined in claim 2 comprises a concentrically waved-meal metal sheet which has valley portions each filled with powdered sealing member and has opposite surfaces and an inner periphery each coated with a molded member of sealing-property.

A gasket as defined in claim 3 comprises the gasket as defined in claim 1 or 2, wherein the powdered sealing member is filled into the valley portions of the metal sheet with such a density that a fastening surface-pressure at every valley portion of the metal sheet becomes lower than that at every mountain-like portion thereof.

According to the gasket as defined in any one of claims 1 to 3, the metal sheet has valley portions, that were conventionally vacant gaps, filled with powdered sealing member to be embedded from the beginning. Therefore, the sheet (claim 1) and the molded member (claim 2) at the valley portions of the metal sheet that conventionally could not be compressed with a low fastening-load applied can be compressed and even with the low fastening-load applied can secure a fastening surface-pressure over the entire surface with the result of being able to obtain a stable sealing-property. Further, since it is possible to suppress the deformation of the sheet and the molded member in quantity, the sheet or the molded member made of not only the high-fluidity material but also the low-fluidity material can be used as well as the thinner sheet and molded member.

Moreover, the sealing member is arranged in two layers on each of the opposite surfaces of the metal sheet. Thus even if the sheet or the molded member, which is an outer sealing member, is broken, the inner sealing member can serve to seal, thereby enabling the sealing reliability to be enhanced. The inner sealing member and the outer sealing member may be made of the same material or may comprise a combination of different materials.

Additionally, the sealing member to be filled into every valley portion of the metal sheet is powdered one that has high compressibility and fluidity so as not to inhibit the deformation of the metal sheet and damage the deformation-following ability of the gasket. Besides, any vacant gap is hardly produced at every valley portion of the metal sheet and therefore a fastening surface-pressure can be stably secured there. The powdered sealing member is inexpensive and also is so high in yield as to be usable without any waste. Thus it is economical.

The gasket as defined in claim 3 comprises the metal sheet, into the valley portions of which the powdered sealing member is filled with such a density that a fastening surface-pressure at every valley portion of the metal sheet becomes lower than that at every mountain-like portion thereof, in order that the fastening surface-pressure is distributed not uniformly nor reduced. This results in no increase of the minimum fastening force required for sealing purpose.

Effect of the Invention

According to the gasket as defined in any one of claims 1 to 3, it has such a structure that comprises a concentrically waved metal sheet, i.e., a core member, which has a sheet of sealing-property layered and bonded on each of its opposite surfaces or which has opposite surfaces and an inner periphery each coated with a molded member of sealing-property. In consequence, the gasket has an adaptability of the material for the sheet or the molded member enhanced and enables the thinner sheet or the thinner molded material to be used and at the same time can ensure a stable sealing-property for a long period of time with a low to a high fastening-load applied.

According to the gasket as defined in claim 3, when it is used, the strength required for the joint portion to the machine or instrument and to the piping does not become large and as a result does not necessitate to review the design or reconstruct the equipment and the device.

EXPLANATION OF NUMERALS

| 10, 20 | gasket |
| --- | --- |
| 11 | waved metal sheet (metal sheet) |
| 11a | valley portion |
| 11b | mountain-like portion |
| 12, 13 | primary sealing member (sheet) |
| 14 | secondary sealing member (sealing member) |
| 21 | another primary sealing member (molded member) |

MOST PREFERRED EMBODIMENT OF THE INVENTION

Figure 1:
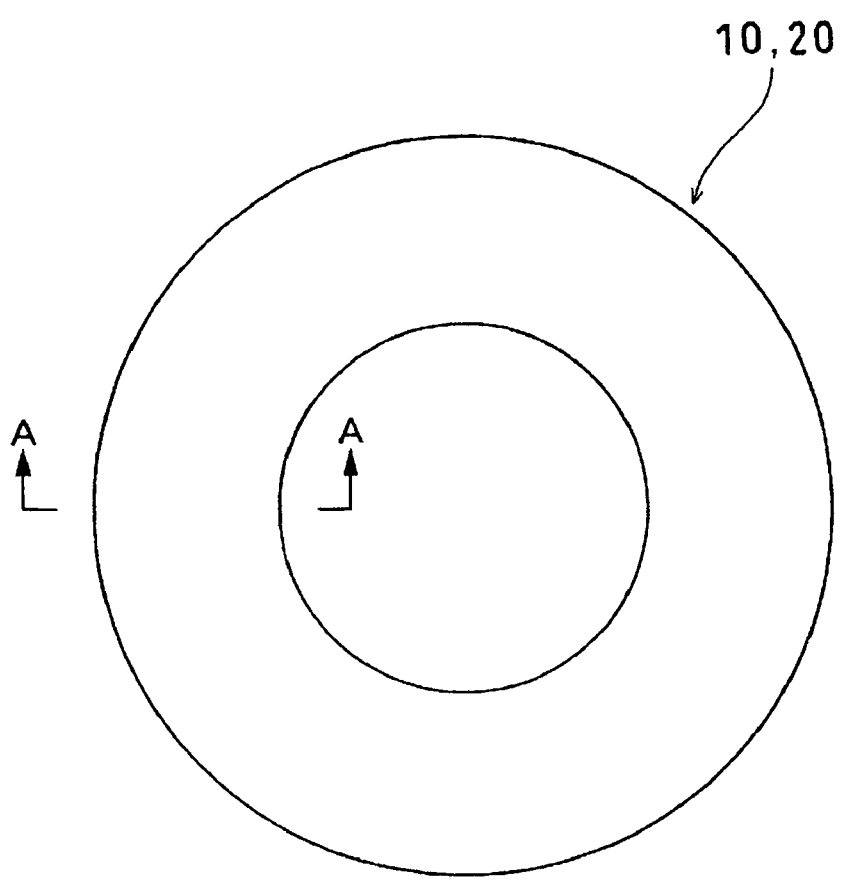
FIG. 1 is a plan view showing a gasket according to a first embodiment of the present invention.
Figure 2:
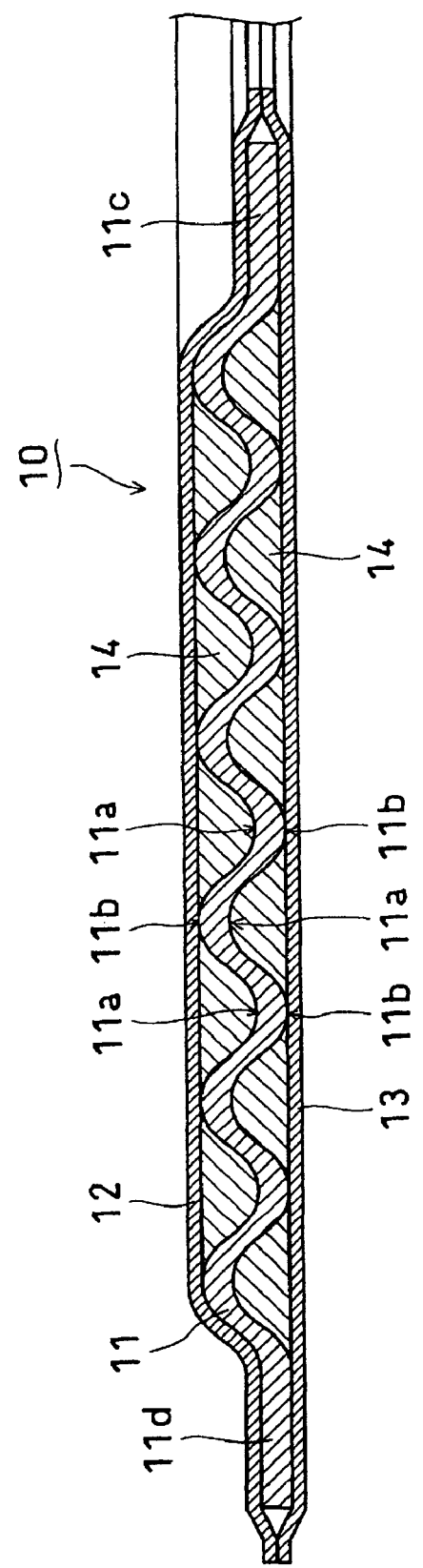
FIG. 2 is a sectional view showing a structure of the gasket according to the first embodiment of the present invention.

Hereafter, an explanation is given for an embodiment of a gasket according to the present invention with reference to the drawings. FIG. 1 is a plan view of a gasket according to a first embodiment of the present invention. FIG. 2 is a sectional view of the gasket according to the first embodiment of the present invention.

Figure 8:
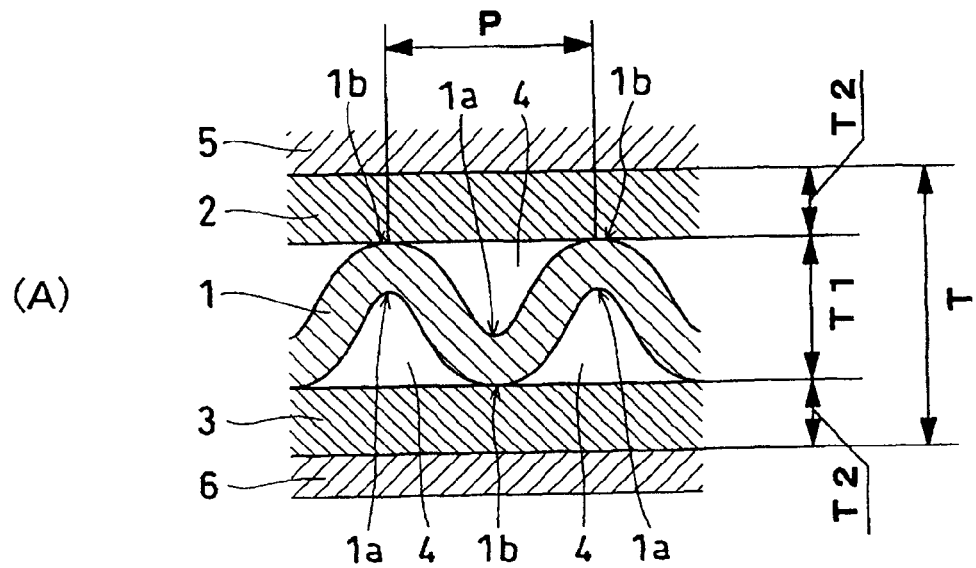
FIGS. 8(A) to 8(C) show the process how the conventional gasket is compressed and deformed.
Figure 8:
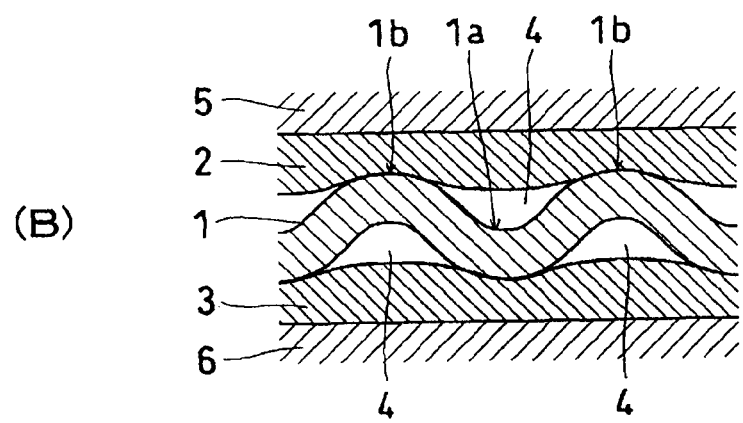
Figure 8:
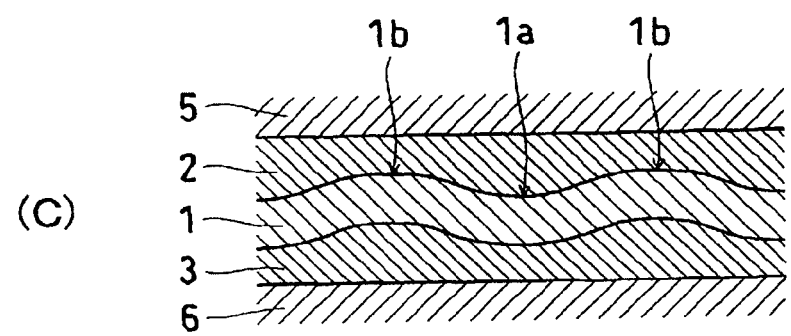

A gasket 10 shown in FIGS. 1 and 2 comprises a concentrically waved circular ring-like metal sheet 11 (hereafter referred to only as 'waved metal sheet'), which is a core member, having circular ring-like outer and inner sheets 12, 13 of sealing-property layered and bonded on its outer and inner opposite surfaces. At portions (FIGS. 8(A) to 8(C)) that were conventionally vacant gaps 4 (between valley portions 11a of the waved metal sheet 11 and the primary sealing members 12, 13), the primary sealing members 12 and 13 at the valley portions 11a of the waved metal sheet 11, which could not be compressed conventionally with a low fastening-load applied, are compressed and with the low fastening-load applied, a fastening surface-pressure can be secured over the entire surface and also a stable sealing-property can be obtained. This gasket suppresses the deformation of the primary sealing members 12, 13 in quantity and enables not only the primary sealing members 12, 13 made of a high-fluidity material but also those made of a low-fluidity material to be used. Further, in order to allow the use of the thinner primary sealing members 12 and 13, a powdered sealing member 14 (hereafter referred to only as 'secondary sealing member') is filled. This secondary sealing member 14 embeds the portions, which were conventionally vacant gaps 4, from the beginning. In consequence, the gasket 10 in concern has such a structure that comprises the waved metal sheet 11 having the secondary sealing member 14 and the primary sealing members 12, 13 arranged on the outer and inner opposite surfaces in two, inner and outer, layers.

Here, the waved metal sheet 11 has an end edge on its inner periphery and an end edge on its outer periphery, which are provided with circular ring-like flat portions 11c and lid positioned, respectively on one plane which includes a top portion of every mountain-like portion 11b projecting toward one side (lower side in FIG. 2) of the waved metal sheet 11. Further, after the secondary sealing member 14 has been filled into the valley portions 11a, the waved metal sheet 11 has the outer and inner opposite surfaces an outer profile of which comprises one outer profile of the outer surface (upper side in FIG. 2) forming a three-dimensional shape with a portion between the outer surfaces of the flat portions 11c and 11d positioned on the same plane, raised as a trapezoidal shape of a low height and the other outer profile of the inner surface (lower side in FIG. 2) forming a planar shape with a portion between the inner surfaces of the flat portions 11c and 11d positioned on the same plane connected by a flat surface. The primary sealing member 12 on the outer surface side of the waved metal sheet 11 is layered and bonded over a portion between an end portion of the flat portion 11c on the inner peripheral side of the waved metal sheet 11 and an end portion of the flat portion 11d on the outer peripheral side thereof, along the one outer profile of the three dimensional shape of the outer surface of the waved metal sheet 11. The primary sealing member 13 on the inner surface side of the waved metal sheet 11 is layered and bonded over a portion between the end portion of the flat portion 11c on the inner peripheral side of the waved metal sheet 11 and the end portion of the flat portion 11d on the outer peripheral side thereof, along the other outer profile of the planar shape of the inner surface of the waved metal sheet 11. The primary sealing members 12 and 13 have inner peripheral end edges projecting radially inwards from the end portion of the flat portion 11c on the inner peripheral side of the waved metal sheet 11, and adhered and fixedly attached to one another on a peripheral side inwards of the end portion of the flat portion 11c and within a thickness of the flat portion 11c. On the other hand, the primary sealing members 12 and 13 have outer peripheral end edges projecting radially outwards from the end portion of the flat portion 11d on the outer peripheral side of the waved metal sheet 11, and adhered and fixedly attached to one another on a peripheral side outwards of the end portion of the flat portion lid and within a thickness of the flat portion 11d.

The gasket 10 is produced by holding the waved metal sheet 11, which is a press-molded product, in a substantially horizontal position and, after the secondary sealing member 14 has been filled into the valley portions 11a on the upper surface side of the waved metal sheet 11, bonding one of the primary sealing members 12 through an adhesive (not shown) in layered fashion to the upper surface (outer surface) of the waved metal sheet 11. Next, the waved metal sheet 11 is turned over and, after the secondary sealing member 14 is filled into the valley portions 11a on the upper surface side of the waved metal sheet 11, the other primary sealing member 13 is layered and bonded to the upper surface (inner surface) of the waved metal sheet 11 through the adhesive (not shown). At the same time, the primary sealing members 12 and 13 have their inner peripheral end edges adhered and fixed attached to one another as well as their outer peripheral end edges, for completing the production of the gasket 10.

At this time, it is important to fill the secondary sealing member 14 into the valley portions 11a of the waved metal sheet 11 with a density lower than that of each of the primary sealing members 12 and 13 so that the fastening surface-pressure at every valley portion 11a of the waved metal sheet 11 becomes lower than that at the mountain-like portion 11b thereof. By filling the secondary sealing member 14 with such a density, the gasket 10 has such a structure that the waved metal sheet 11 has the secondary sealing member 14 (of a lower density) and the primary sealing members 12, (of a higher density) different from each other in density arranged on its outer and inner opposite surfaces in two, inner and outer, layers.

Figure 3:
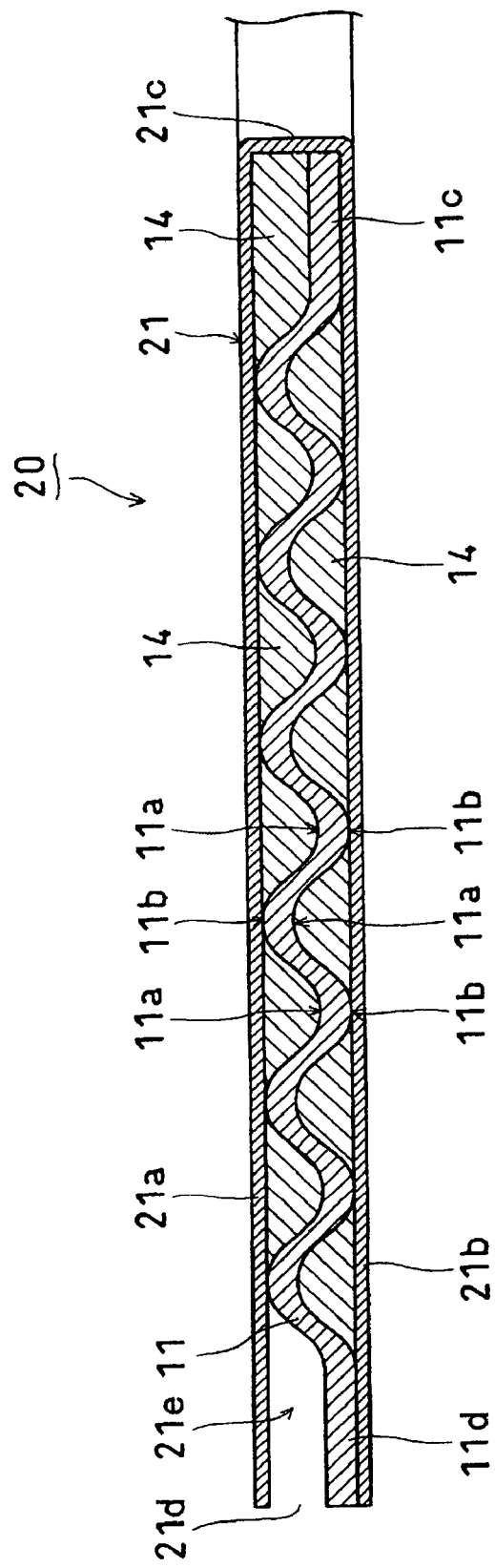
FIG. 3 is a sectional view showing a structure of a gasket according to another embodiment of the present invention.

FIG. 3 is a sectional view showing the structure of a gasket according to another embodiment of the present invention. The gasket according to the present embodiment has a plane identical to that of the gasket 10 shown in FIG. 1. Further, since the gasket of the present embodiment has the structure identical to that shown in FIG. 2 of the gasket 10 except the primary sealing member, the identical constructions are designated by the identical numerals so as to omit the detailed explanation.

The gasket 20 illustrated in FIG. 3 comprises the waved metal sheet 11 having the outer and inner opposite surfaces and the inner periphery each continuously coated with a PTFE or metal molded member 21 (hereafter referred to only as 'another primary sealing member') of an integral structure, produced by machining a circular ring-like PTFE flat plate or a metal flat plate. The another primary sealing member 21 includes mutually opposing circular ring-like sheet portions 21a and 21b in the thickness-direction, and a short cylindrical connection portion 21c continuously and integrally formed between end edges on the inner peripheral sides of those sheet portions 21a and 21b. There is formed a core-housing space 21e having an outer periphery provided with an opening 21d, inside the sheet portions 21a and 21b, and the connection portion 21c. The waved metal sheet 11 is attached to the core-housing space 21e, and the sheet portions 21a and 21b are provided so as to extend from the upper and lower end portions of the connection portion 21c made straightly upright inside the flat portion 11c on the inner peripheral side of the waved metal sheet 11 to the outer and inner opposite surface sides thereof.

The gasket 20 is produced by holding the another primary sealing member 21 in a horizontal position and rolling one of the sheet portions 21a on the upper surface side up to a cylindrical surface identical to that of the connection portion 21c and, after the waved metal sheet 11 has been fitted into the outer side of the connection portion 21c through the cylindrical sheet portion 21a from above, filling the secondary sealing member 14 into the valley portions 11a on the upper surface side of the waved metal sheet 11. Next, the cylindrical sheet portion 21a is returned to its original state and is bonded to the upper surface (outer surface) of the waved metal sheet 11 in layered fashion through an adhesive (not shown). Subsequently, the waved metal sheet 11 is turned over and another sheet portion 21b on the upper surface side is rolled up to the cylindrical surface identical to that of the connection portion 21c, and thereafter the secondary sealing member 14 is filled into the valley portions 11a on the upper surface side of the waved metal sheet 11. Then the cylindrical sheet portion 21b is returned to its original state and is bonded to the upper surface (inner surface) of the waved metal sheet 11 in layered fashion through the adhesive (not shown) for completing the production of the gasket 20. At this time, as it has been done for the above-mentioned gasket 10, it is important to fill the secondary sealing member 14 into the valley portions 11a of the waved metal sheet 11 with a density lower than that of the another sealing member 21.

It is to be noted that in the case of this gasket 20, there is formed a vacant space at an inside corner portion on its inner periphery (between the flat portion 11c of the waved metal sheet 11 and an end edge portion on an inner periphery of one of the sheets 21a). Accordingly, the secondary sealing member 14 is filled into that vacant space as well to embed it.

Since each of the gaskets 10, 20 constructed as mentioned above, exerts the sealing function according to the same mechanism, this mechanism is explained with reference to the process of compressing and deforming the gasket 10, 20 shown in FIGS. 4(A) to 4(C).

Figure 4:
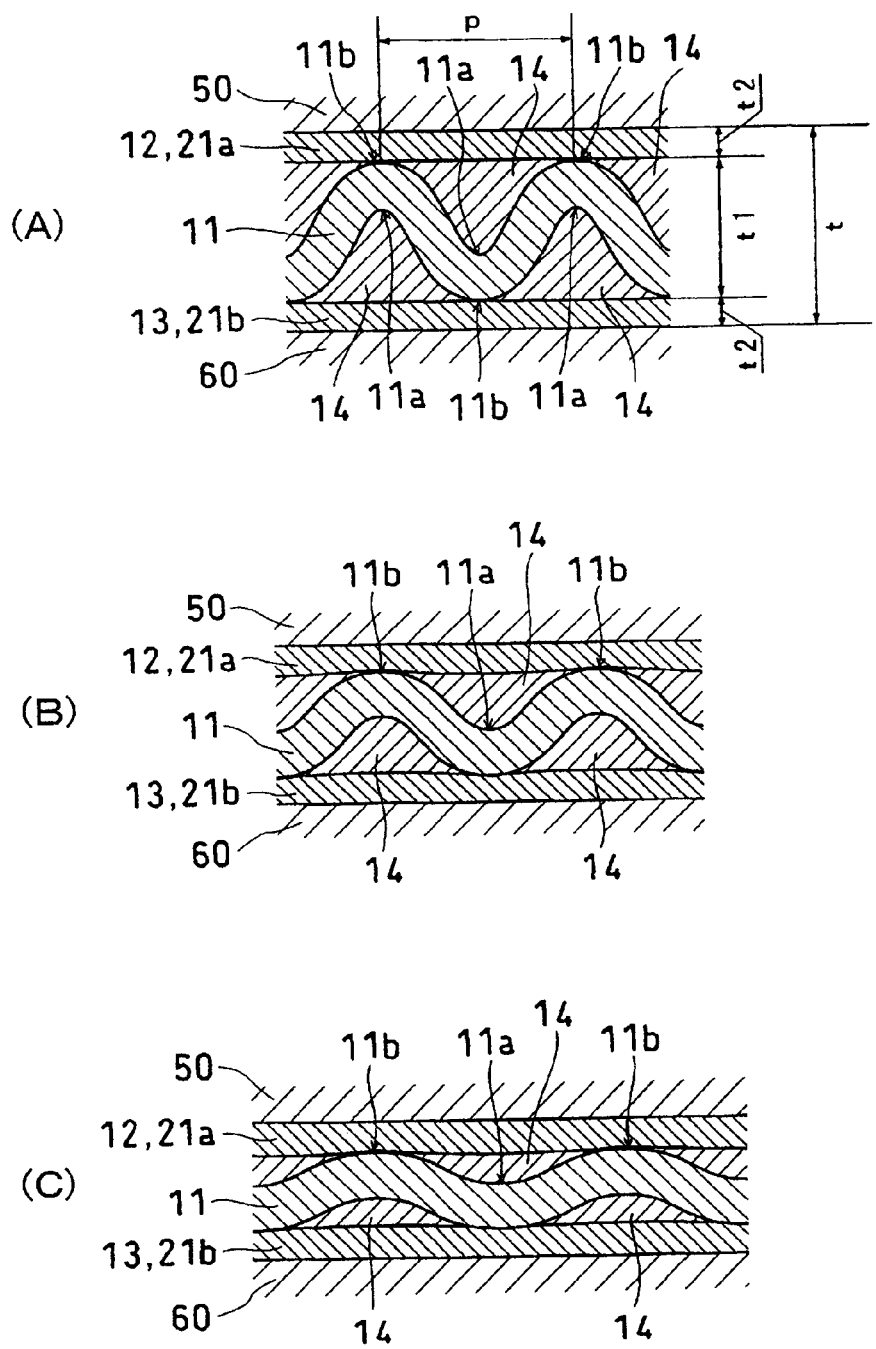
FIGS. 4(A) to 4(C) show the process how the gasket according to the first and the another embodiments of the present invention are compressed and deformed.

In FIGS. 4(A) to 4(C), numerals 50 and 60 designate flanges of the machine or instrument and the piping, respectively and alphabetical letter (t) indicates a thickness of the gasket.

In a free state shown in FIG. 4(A) before the gasket has been fastened, the waved metal sheet 11 has an original wave-pitch (p) and wave-height (t1/2) (height of the mountain-like portion (t1)). The primary sealing members 12 and 13 each has a uniform thickness (t2) in its entirety as well as the sheet portions 21a and 21b of another sealing member 21. The portions that were conventionally vacant gaps 4 (between the valley portions 11a of the waved metal sheet 11 and the primary sealing members 12 and 13, or the another sealing member 21) are filled with the secondary sealing member 14.

In a fastened state shown in FIG. 4(B) with a low fasting-load applied, the gasket 10, 20 is compressed in a thickness-direction between the mutually opposing flanges 50 and 60. Thus the waved metal sheet 11 is decreasing its wave-height (t1/2) but increasing its wave-pitch (p). Further while making compression-deformation in the thickness-direction, it also performs extension-deformation in a direction of the plane (radially inwards and outwards). The primary sealing members 12 and 13 are compressed in the thickness-direction at the mountain-like portions 11b of the waved metal sheet 11 as well as the sheet portions 21a and 21b of the another sealing member 21, and the waved metal sheet 11 has its valley portions 11a filled with the secondary sealing member 14. Thus the waved metal sheet 11 is also compressed at the valley portions 11a. As a result, the gasket 10, 20 secures a fastening surface-pressure over the entire surfaces of the mountain-like portions 11b and the valley portions 11a of the waved metal sheet 11, thereby allowing a stable sealing-property to be exerted.

In another fastened state shown in FIG. 4(C) with a high fastening-load applied, the gasket 10, 20 is more compressed in the thickness-direction between the mutually opposing flanges 50 and 60. Thus the waved metal sheet 11 is more decreasing its wave-height (t1/2) but increasing its wave-pitch (p). Further while making more compression-deformation in the thickness-direction to a state close to a flat plate, it also performs further extension-deformation in the direction of the plane. The primary sealing members 12 and 13 are compressed in the thickness-direction at the mountain-like portions 11b of the waved metal sheet 11 as well as the sheet portions 21a and 21b of the another sealing member 21, and the waved metal sheet 11 has its valley portions 11a filled with the secondary sealing member 14. Thus the waved metal sheet 11 is also more compressed at the valley portions 11a. As a result, the gasket 10, 20 secures a higher fastening surface-pressure over the entire surfaces of the mountain-like portions 11b and the valley portions 11a of the waved metal sheet 11, thereby enabling the stable sealing-property obtained with the low fastening-load applied to be continuously maintained.

Thus, as for the gasket 10, 20, the waved metal sheet 11 has valley portions 11a, that were conventionally vacant gaps 4, filled with the secondary sealing member 14 to be embedded from the beginning. Therefore, the primary sealing members 12, 13 as well as the sheet portions 21a and 21b of the another sealing member 21 at the valley portions 11a of the waved metal sheet 11 that conventionally could not be compressed with a low fastening-load applied can be compressed and even with the low fastening-load applied can secure a fastening surface-pressure over the entire surface with the result of being able to obtain a stable sealing-property with a low fastening-load applied. In consequence, it can secure a stable sealing-property for a long period of time with a low to a high fastening-load applied.

Further, as for the gasket 10, 20, the waved metal sheet 11 has valley portions 11a, that were conventionally vacant gaps 4, filled with the secondary sealing member 14 to be embedded from the beginning. Therefore, the primary sealing member 12, 13 as well as the another sealing member 21 suppresses the deformation in an attempt to embed the valley portions 11a of the waved metal sheet 11, thanks to their own fluidity and thickness, t1, t2 with the result of extremely decreasing the deformation of the primary sealing members 12 and 13 as well as the sheet portions 21a and 21b of the another sealing member 21 in quantity. Therefore, the primary sealing members 12 and 13, and the another sealing member 21, each of which is formed from not only the high-fluidity material but also the low-fluidity material, can be used (to enhance the adaptability of the materials for the primary sealing members 12 and 13 as well as those for the another sealing member 21) as well as the thinner primary sealing members 12 and 13, and the thinner another sealing member 21.

Moreover, the gasket 10, 20 has such a structure that the waved metal sheet 11 has the secondary sealing member 14 and the primary sealing member 12, 13 or the sheet portions 21a and 21b of the another sealing member 21 arranged in two, inner and outer, layers on its outer and inner opposite surfaces. Thus even if the outer primary sealing members 12 and 13 or the another sealing member 21 are broken, the inner secondary sealing member 14 can serve to seal, thereby enabling the sealing reliability to be enhanced. The inner secondary sealing member 14 and the outer primary sealing members 12, 13 or the another sealing member 21 may be made of the same material or may comprise a combination of different materials.

Additionally, as to the gasket 10, 20, the secondary sealing member 14 to be filled into every valley portion 11a of the waved metal sheet 11 is powdered one that has both of the compressibility and fluidity so high that it well follows the shape-variation of every valley portion 11a of the waved metal sheet 11 and is compressed and flowed within every valley portion 11a of the waved metal sheet 11 with the result of not inhibiting the deformation of the waved metal sheet 11 nor damaging the deformation—following ability of the gasket 10, 20. Besides, any vacant gap is hardly produced at every valley portion 11a of the waved metal sheet 11 and therefore a fastening surface-pressure can be stably secured there. The powdered secondary sealing member 14 is inexpensive and also is so high in yield as to be usable without any waste. Thus it is economical.

Further, in the gasket 10, 20, the waved metal sheet 11 has valley portions 11a filled with the secondary sealing member 14 with a density lower than that of each of the primary sealing members 12 and 13 or the another sealing member 21. Thus even with any fastening load applied, the fastening surface-pressure at every valley portion 11a of the waved metal sheet 11 becomes lower than that at every mountain-like portion 11b thereof, so that the fastening surface-pressure is distributed not uniformly nor reduced. This results in no increase of the minimum fastening force required for sealing purpose. In consequence, when it is used, the strength required for the joint portion to the machine or instrument and to the piping does not become large and as a result does not necessitate to review the design or reconstruct the equipment and the device.

As mentioned above, as for the gasket 10, 20, it is possible to use the primary sealing members 12 and 13 or the another sealing member 21 each of which is formed from not only the high-fluidity material but also the low-fluidity one. Accordingly, its material is appropriately selected for use depending on the usage, from among various kinds of sealing materials nominated as alternative ones of asbestos. For example, (A) An expanded graphite sheet is available as the primary sealing members 12 and 13 for the non-oxidizable fluid having a temperature of not more than 400° C. Further, in this usage, usable for the secondary sealing member 14 are powdered graphite such as expanded graphite and graphite leaves, powdered PTFE, or inorganic materials such as mica, talc, vermiculite and the like, in powdered state.

(B) A PTFE sheet is available as the primary sealing members 12 and 13 and a PTFE molded member is usable as the another sealing member 21 for most of the acid or alkaline fluids having a temperature of not more than 260° C. Further, in this usage, usable for the secondary sealing member 14 are powdered PTFE, powdered graphite such as expanded graphite and graphite leaves, or inorganic materials such as mica, talc, vermiculite and the like, in powdered state.

(C) An inorganic sheet such as a mica sheet, a vermiculite sheet or a metal sheet is available as the primary sealing members 12 and 13, and a metal molded member is usable as the another primary sealing member 21, for the oxidizable fluids having a temperature of not less than 400° C. Further, in this usage, usable for the secondary sealing member 14 is inorganic materials such as mica, talc, vermiculite and the like, in powdered state.

Additionally, as for the materials of the waved metal sheet 11, from the view-point of the temperature of the internal fluid and the anti-corrosion property to the internal fluid, as far as it is a metal sheet made of any one of copper, iron, mild steel, stainless steel, aluminum and the like, it can be used for any usage mentioned at the above paragraphs (A) to (C).

Subsequently, Example for each of the usages mentioned at the paragraphs (A) to (C) of the gasket according to the present invention is explained.

EXAMPLE 1

(A) Non-Oxidizable Fluid Having a Temperature of not More than 400° C.

A waved metal sheet (material: stainless steel [316L]), thickness: 0.5 mm, wave-pitch (p): 3.2 mm, wave-height (t1/2): 0.55 mm [height of the mountain-like portion (t1): 1.1 mm]) was used for the waved metal sheet 11 and an expanded-graphite sheet (thickness (t2): 0.8 mm) was employed for each of the primary sealing members 12 and 13, and the expanded-graphite powder (average particulate diameter of 200 μm) was used for the secondary sealing member 14 to form the gasket as shown in FIGS. 1 and 2 (hereafter referred to only as "Example 1").

Produced as Comparison Example of the Example 1 was a gasket (hereafter referred to only as "Comparison Example 1") of the same structure as that of the Example 1 except that the secondary sealing member 14 was not filled.

Figure 5:
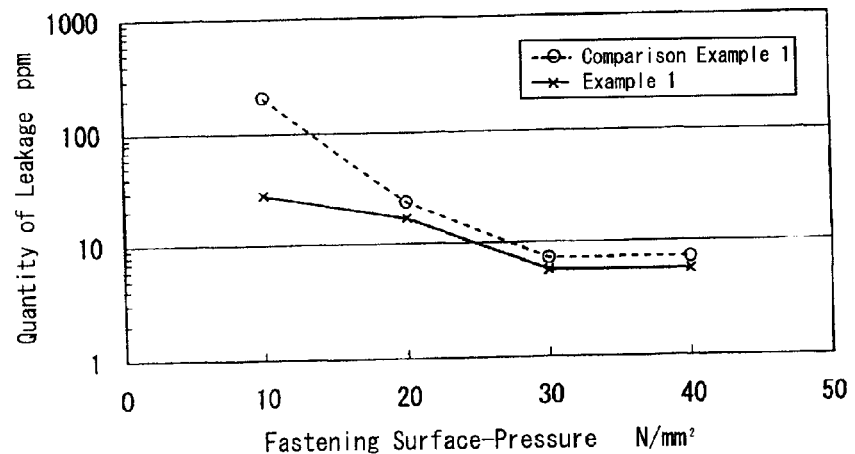
FIG. 5 is a line graph showing the sealing-property of each of Example 1 and Comparison Example 1.

FIG. 5 illustrates a sealing-property of each of the Example 1 and the Comparison Example 1. The He (helium)-gas sealing test was conducted at the normal temperature for the Example 1 and the Comparison Example so as to compare their sealing-properties with each other and the result is shown in FIG. 5. In FIG. 5, the Example 1 was excellent in the sealing-property with a low fastening-load (surface-pressure) applied, when compared with the Comparison Example 1. This has made it confirm that a stable sealing-property can be secured for a long period of time with a low to a high fastening load applied, by filling the valley portions 11a of the waved metal sheet 11, which were conventionally vacant gaps 4, with the secondary sealing member 14 to embed them from the beginning.

The relationship between the thickness of each of the primary sealing members 12 and 13 (expanded graphite sheet) and the sealing-property as regards the Example 1 and the Comparison Example 1 is shown in Table 1 described below.

TABLE 1

| Thickness | Sealing-property | |
|---|---|---|
| of the sheet (mm) | Comparison Example 1 | Example 1 |
| 0.125 | X | Δ |
| 0.250 | X | ○ |
| 0.38 | Δ | ○ |
| 0.8 | ○ | ○ |

○: good,
Δ: normal,
X: bad

The He-gas sealing test was conducted for the Example 1 and the Comparison Example 1 while varying the thickness of each of the primary sealing members 12 and 13 and the sealing-properties were mutually compared per thickness.

The result is shown in this Table 1. In this Table 1, the Example 1 could obtain a stable sealing-property with the primary sealing members 12 and 13 of a thickness (t2) smaller than that of the Comparison Example 1. This has made it confirm that the thinner primary sealing members 12 and 13 or the thinner another sealing member 21 can be used by filling the valley portions 11a of the waved metal sheet 11, which were conventionally vacant gaps 4, with the secondary sealing member 14 to embed them from the beginning.

EXAMPLE 2

(B) Acid or Alkaline Fluid Having a Temperature of not More than 260° C.

A waved metal sheet (material: stainless steel [316L]), thickness: 0.5 mm, wave-pitch (p): 3.2 mm, wave-height (t1/2): 0.55 mm [height of the mountain-like portion (t1)]: 1.1 mm) was used for the waved metal sheet 11, and a porous PTFE sheet (thickness (t2): 0.5 mm) was employed for each of the primary sealing members 12 and 13, and PTFE powder (average particulate diameter of 50 μm) was used for the secondary sealing member 14 to form the gasket as shown in FIGS. 1 and 2 (hereafter referred to only as "Example 2").

Produced as Comparison Example of the Example 2 was a gasket (hereafter referred to only as "Comparison Example 2") of the same structure as that of the Example except that the secondary sealing member 14 was not filled.

Figure 6:
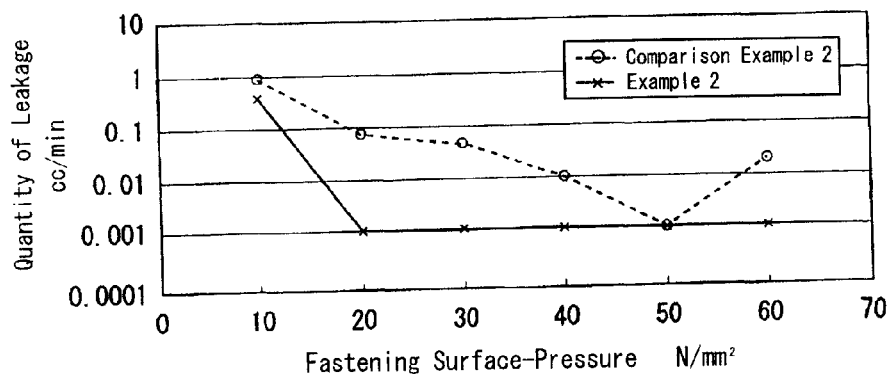
FIG. 6 is a line graph showing the sealing-property of each of Example 2 and Comparison Example 2.

FIG. 6 illustrates a sealing-property of each of the Example 2 and the Comparison Example 2. The He-gas sealing test was conducted at the normal temperature for the Example 2 and the Comparison Example 2 so as to compare their sealing-properties with each other and the result is shown in FIG. 6. In FIG. 6, the Example 2 was excellent in the sealing-property with a low to a high fastening-load (surface-pressure) applied, when compared with the Comparison Example 2. Further, as to the Comparison Example 2, the primary sealing members 12 and 13 were broken with a high fastening-load applied to invite the occurrence of leakage. This has made it confirm that a stable sealing-property can be secured for a long period of time with a low to a high fastening load applied and even the primary sealing members 12 and 13, and another sealing member 21, each of which was made of a low-fluidity material, can be used without being broken with a high fastening-load applied, by filling the valley portions 11a of the waved metal sheet 11, which were conventionally vacant gaps 4, with the secondary sealing member 14 to embed them from the beginning.

The relationship between the thickness of each of the primary sealing members 12 and 13 (porous PTFE sheet) and the sealing-property as regards the Example 2 and the Comparison Example 2 is shown in the Table 2 described below.

TABLE 2

| Thickness of the sheet (mm) | Sealing-property | |
|---|---|---|
| | Comparison Example 2 | Example 2 |
| 0.25 | X | ○ |
| 0.50 | X | ○ |
| 0.75 | Δ | ○ |
| 1.00 | ○ | ○ |
| 1.50 | ○ | ○ |

○: good,
Δ: normal,
X: bad

The He-gas sealing test was conducted for the Example 2 and the Comparison Example 2 while varying the thickness of each of the primary sealing members 12 and 13 and the sealing-properties were mutually compared per thickness. The result is shown in this Table 2. In this Table 2, the Example 2 could obtain a stable sealing-property with the primary sealing members 12 and 13 of a thickness (t2) remarkably smaller than that of the Comparison Example 2. This has made it confirm that the thinner primary sealing members 12 and 13 or the thinner another sealing member 21 can be used by filling the valley portions 11a of the waved metal sheet 11, which were conventionally vacant gaps 4, with the secondary sealing member 14 to embed them from the beginning.

EXAMPLE 3

(C) Oxidizable Fluid Having a Temperature of not Less than 400° C.

A waved metal sheet (material: stainless steel [316L]), thickness: 0.5 mm, wave-pitch (p): 3.2 mm, wave-height (t1/2): 0.55 mm [height of the mountain-like portion (t1): 1.1 mm]) was used for the waved metal sheet 11, and a mica sheet (thickness (t2): 0.5 mm) was employed for each of the primary sealing members 12 and 13, and the mica powder (average particulate diameter of 50 μm) was used for the secondary sealing member 14 to form the gasket as shown in FIGS. 1 and 2 (hereafter referred to only as "Example 3").

Produced as Comparison Example of the Example 3 was a gasket (hereafter referred to only as "Comparison Example 3") of the same structure as that of the Example except that the secondary sealing member 14 was not filled.

Figure 7:
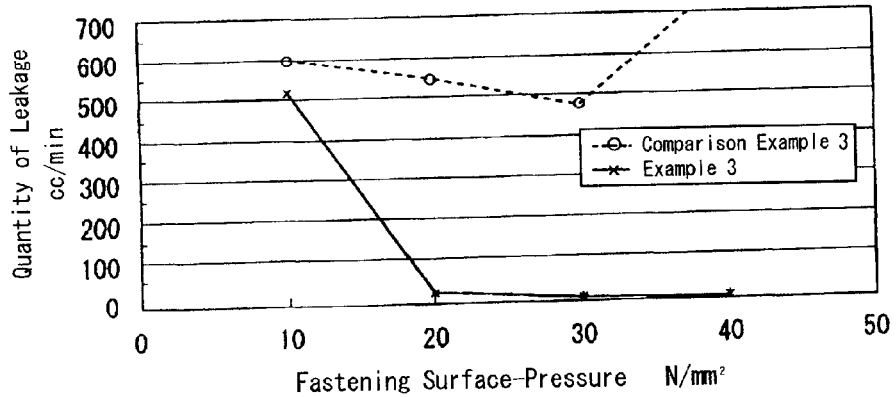
FIG. 7 is a line graph showing the sealing-property of each of Example 3 and Comparison Example 3.

FIG. 7 illustrates a sealing-property of each of the Example 3 and the Comparison Example 3. The N2 (nitrogen)-gas sealing test was conducted at the normal temperature for the Example 3 and the Comparison Example so as to compare their sealing-properties with each other and the result is shown in FIG. 7. In FIG. 7, the Example 3 was excellent in the sealing-property with a low to a high fastening-load (surface-pressure) applied, when compared with the Comparison Example 3. Further, as to the Comparison Example 3, the primary sealing members 12 and 13 were broken with a high fastening-load applied to invite the occurrence of leakage. This has made it confirm that a stable sealing-property can be secured for a long period of time with a low to a high fastening load applied and even the primary sealing members 12 and 13 or the another sealing member 21, each of which is made of a low-fluidity material, can be used without being broken with a high fastening-load applied, by filling the valley portions 11a of the waved metal sheet 11, which were conventionally vacant gaps 4, with the secondary sealing member 14 to embed them from the beginning.

The relationship between the thickness of each of the primary sealing members 12 and 13 (mica sheet) and the sealing-property as regards the Example 3 and the Comparison Example 3 is shown in Table 3 described below.

TABLE 3

| Thickness of the sheet (mm) | Sealing-property | |
|---|---|---|
| | Comparison Example 3 | Example 3 |
| 0.10 | X | Δ |
| 0.25 | X | ○ |
| 0.50 | X | ○ |

TABLE 3-continued

| Thickness of the sheet (mm) | Sealing-property | |
| --- | --- | --- |
| | Comparison Example 3 | Example 3 |
| 0.75 | Δ | ○ |
| 1.00 | Δ | ○ |

○: good,
Δ: normal,
X: bad

The N2-gas sealing test was conducted for the Example 3 and the Comparison Example 3 while varying the thickness of each of the primary sealing members 12 and 13 and the sealing-properties were mutually compared per thickness. The result is shown in this Table 3. In this Table 3, the Example 3 could obtain a stable sealing-property with the primary sealing members 12 and 13 of the standard thickness (t2) that the Comparison Example 3 could not get. This has made it confirm that the thinner primary sealing members 12 and 13 or the thinner another sealing member 21 each of which has the standard thickness can be used by filling the valley portions 11a of the waved metal sheet 11, which were conventionally vacant gaps 4, with the secondary sealing member 14 to embed them from the beginning.

The invention claimed is:

1. A ring-shaped gasket comprising:
a concentrically waved, ring-shaped metal sheet which has valley portions and peak portions on each of opposite surfaces thereof;
powder which fills said valley portions on each of the opposite surfaces of the metal sheet;
the powder is filled into the valley portions of the metal sheet with such a density that a fastening surface-pressure at every valley portion of the metal sheet becomes lower than that at every peak portion thereof; and
ring-shaped sheets having sealing-property which are respectively layered over the opposite surfaces of the metal sheet and bonded on the peak portions of each of the opposite surfaces of the metal sheet.

2. A ring-shaped gasket comprising:
a concentrically waved, ring-shaped metal sheet which has valley portions and peak portions on each of opposite surfaces thereof;
powder which fills said valley portions on each of the opposite surfaces of the metal sheet;
the powder is filled into the valley portions of the metal sheet with such a density that a fastening surface-pressure at every valley portion of the metal sheet becomes lower than that at every peak portion thereof; and
a molded member having sealing-property which covers the opposite surtaces of the metal sheet and an inner periphery of the metal sheet and which is bonded on the peak portions of each of the opposite surface of the metal sheet.

3. The gasket as defined in claim 1, wherein inner peripheral ends of the sheets extend radially inward from the metal sheet and are bonded to each other, and outer peripheral ends of the sheets extend radially outward from the metal sheet and are bonded to each other.

4. The gasket as defined in claim 3, wherein the concentrically waved, ring-shaped metal sheet further comprises ring-shaped flat portions that extend respectively radially inward and outward from the concentrically waved portion, the flat portions being positioned at a single plane that includes the peak portions of one of the opposite surfaces of the metal sheet.

* * * * *